United States Patent
Lee (10) Patent No.: US 7,834,771 B2
(45) Date of Patent: Nov. 16, 2010

(54) FIRE DETECTOR USING A LASER RANGE FINDER, AN INFRARED CAMERA AND A CHARGED COUPLED DEVICE CAMERA

(75) Inventor: Yeu Yong Lee, Seoul (KR)

(73) Assignee: Chang Sung Ace Co., Ltd., Seongnam-Si, Gyenggi-Do (KR)

( * ) Notice: Subject to any disclaimer, the term of this patent is extended or adjusted under 35 U.S.C. 154(b) by 0 days.

(21) Appl. No.: 12/534,325

(22) Filed: Aug. 3, 2009

(65) Prior Publication Data
US 2010/0117839 A1 May 13, 2010

(30) Foreign Application Priority Data
Nov. 11, 2008 (KR) .................... 10-2008-0111793

(51) Int. Cl.
*G08B 17/12* (2006.01)
(52) U.S. Cl. .................. 340/577; 340/578; 340/539.22; 250/339.15
(58) Field of Classification Search .................. 340/577, 340/539.262, 578, 539.26, 539.27, 539.22; 702/2; 382/100; 250/339.15
See application file for complete search history.

(56) References Cited

U.S. PATENT DOCUMENTS 4,893,026 A * 1/1990 Brown de Colstoun et al. .. 250/574

2009/0060260 A1 * 3/2009 Hou ........................... 382/100

FOREIGN PATENT DOCUMENTS

| JP | 05-020563 | 1/1993 |
| JP | 10-222776 | 8/1998 |
| KR | 100638120 | 1/2006 |
| KR | 1020080065833 | 7/2008 |

* cited by examiner

*Primary Examiner*—Jeffery Hofsass
(74) *Attorney, Agent, or Firm*—IPLA P.A.; James E. Bame (57) ABSTRACT

A system and method for detecting a fire includes a fire detection device and a control center terminal. The fire detection device includes an LRF for calculating a distance to a location of breakout of a fire using a laser. An infrared camera captures an infrared image and transmits the infrared image to a control unit. A CCD camera captures a CCD image and transmits the CCD image to the control unit. The control unit analyzes the infrared image, determines whether a fire has broken out, performs processing such that the CCD camera captures an area on fire, determines the location of breakout of the fire, performs processing such that the captured image is output to the control center terminal, and controls a function of a warning unit. The warning unit outputs a warning sound or a warning message.

10 Claims, 6 Drawing Sheets

FIRE DETECTOR USING A LASER RANGE FINDER, AN INFRARED CAMERA AND A CHARGED COUPLED DEVICE CAMERA

CROSS REFERENCE

This application claims foreign priority under Paris Convention and 35 U.S.C. §119 to Korean Patent Application No. 10-2008-0111793, filed Nov. 11, 2008 with the Korean Intellectual Property Office.

BACKGROUND OF THE INVENTION

1. Field of the Invention

The present invention relates, in general, to a system and method for detecting a fire, and, more particularly, to a method and system for detecting a fire, in which a fire detection device equipped with a Laser Ranger Finder (LRF) captures an image required to detect a fire and analyzes the shape pattern of the image, and allows accurate and prompt determination as to whether a fire has broken out or not and where, thus providing a suitable warning.

2. Description of the Related Art

The present invention relates to a system and method for detecting a fire.

Generally, fires are disasters causing damage that is too large for human beings to even estimate the extent thereof because they not only injure human lives and burn buildings and articles, but also, in the case of forest fires, destroy trees and forests which have grown over a period ranging from several tens of years to several hundreds of years or several thousands of years.

Therefore, the best method is to prevent such a fire from breaking out, but it is also considerably important to promptly detect a fire which cannot be prevented and to immediately and promptly extinguish the fire using an optimal method.

Therefore, fire detection systems have recently been developed, and such conventional fire detection systems may perform fire monitoring using thermal sensors, smoke sensors, images, etc. due to the limitations of fire monitoring performed with the naked eyes.

The methods using thermal sensors or smoke sensors may be effectively used in a limited area such as in an indoor environment, but there is large difficulty in using the above methods when the area to be monitored is an outdoor environment as is the case concerning forest fires.

Furthermore, in the case of fire monitoring using images, it is difficult to detect an accurate location and angle at which a fire has broken out.

SUMMARY OF THE INVENTION

Accordingly, the present invention has been made keeping in mind the above problems occurring in the prior art, and an object of the present invention is to provide a system and method for detecting a fire, which capture an image required to detect a fire using an infrared camera and analyze the shape pattern and color of the image, so that whether a fire has broken out and a speed at which the fire is spreading can be determined, and where the fire has broken out can be accurately and promptly determined using a Laser Ranger Finder (LRF), thus providing a suitable warning.

Another object of the present invention is to provide a system and method for detecting a fire, which automatically determine whether a fire has broken out using the thermal sensing function of an infrared camera, and allow a high-quality CCD camera to capture an image of an area on fire after it is determined that the fire has broken out, thus enabling the area on fire to be easily observed.

In accordance with an aspect of the present invention to accomplish the above objects, there is provided a system for detecting a fire, the system including a fire detection device and a control center terminal, wherein the fire detection device comprises a Laser Range Finder (LRF) for calculating a distance to a location of breakout of a fire using a laser when the fire has broken out; an infrared camera for capturing an infrared image and transmitting the infrared image to a control unit; a Charge Coupled Device (CCD) camera for capturing a CCD image and transmitting the CCD image to the control unit; the control unit for analyzing the infrared image received from the infrared camera, determining whether a fire has broken out, performing processing such that the CCD camera captures an area on fire if it is determined that the fire has broken out, determining the location of breakout of the fire using coordinates of an installation location of the infrared camera, the distance received from the LRF, and a capturing angle received from the infrared camera, performing processing such that the image captured by the infrared camera or the CCD camera is output to the control center terminal, and controlling a function of a warning unit; and the warning unit for outputting a warning sound or a warning message under control of the control unit when the fire has broken out.

In this case, the control unit is configured such that, when an area having a temperature equal to or greater than a reference temperature is present in the captured image received from the infrared camera, the control unit determines the area to be an area on fire, generates a contour of the area on fire by extracting a contour of an image of the area on fire, generates a basic contour by extracting a contour of an image of the area before the fire breaks out, compares the contour of the area on fire with the basic contour, and determines a matching area to be an ignition area, and remaining areas to be flames.

Further, the control unit is configured such that, when an area having a temperature equal to or greater than a reference temperature is present in the captured image received from the infrared camera, the control unit determines the area to be an area on fire, generates a contour of the area on fire by extracting a contour of an image of the area on fire, and determines an area of the contour to be a flame when the contour continuously varies for a preset period of time or longer.

Preferably, the control unit may obtain information about a size of the flame and a spreading speed of the flame and enable the obtained information to be output to the control center terminal.

Meanwhile, the control unit performs processing such that information about breakout of the fire, the location of breakout of the fire, the size of the flame, and the spreading speed of the flame is provided to a pre-designated disaster prevention center when the fire has broken out.

Further, the infrared camera or the CCD camera comprises a camera driving unit capable of controlling focusing or tracking operation of the infrared camera or the CCD camera under control of the control unit.

Preferably, when the control unit outputs the image captured by the infrared camera or the CCD camera to the control center terminal, the control unit connects images, captured by the infrared camera or the CCD camera while the infrared camera or the CCD camera is rotating at angles of 360°, as a single panoramic image file, and enables the panoramic image file to be continuously displayed on the control center terminal.

Further, when the system uses a plurality of fire detection devices, an average point of locations of breakout of the fire received from one or more fire detection devices is determined to be an actual location of breakout of the fire.

In accordance with another aspect of the present invention to accomplish the above objects, there is provided a system for detecting a fire, the system including one or more fire detection devices and a control center terminal, wherein each of the fire detection devices comprises a Laser Range Finder (LRF) for calculating a distance to a location of breakout of a fire using a laser when the fire has broken out; an infrared camera for capturing an infrared image and transmitting the infrared image to a control unit; a Charge Coupled Device (CCD) camera for capturing a CCD image and transmitting the CCD image to the control unit; a control unit for analyzing the infrared image received from the infrared camera, determining whether a fire has broken out, performing processing such that the CCD camera captures an area on fire if it is determined that the fire has broken out, performing processing such that the image captured by the infrared camera or the CCD camera is output to the control center terminal, and controlling a function of a warning unit; and the warning unit for outputting a warning sound or a warning message under control of the control unit when the fire has broken out, and wherein the control center terminal generates two distance intersections using distances which are measured by respective LRFs and are received from two fire detection devices, generates one angle intersection using capturing angles of respective infrared cameras which are received from the fire detection devices, detects a distance intersection closer to the angle intersection, and determines an average point of the detected distance intersection and the angle intersection to be an actual location of breakout of the fire.

In accordance with a further aspect of the present invention to accomplish the above objects, there is provided a method of detecting a fire, comprising (A) an infrared camera capturing an infrared image to detect a fire; (B) transmitting the infrared image captured by the infrared camera to the control center terminal, analyzing the infrared image, and determining whether a fire has broken out; (C) if it is determined at (B) that the fire has broken out, a CCD camera capturing an area in which the fire has broken out, transmitting a CCD image captured by the CCD camera to the control center terminal, and determining a location of breakout of the fire using coordinates of an installation location of the infrared camera, the distance received from the LRF, and the capturing angle received from the infrared camera; and (D) if it is determined at (B) that the fire has broken out, outputting a fire warning signal.

In this case, (B) may be performed such that, when an area having a temperature equal to or greater than a reference temperature is present in the captured image received from the infrared camera, the area is determined to be an area on fire, a contour of the area on fire is generated by extracting a contour of an image of the area on fire, a basic contour is generated by extracting a contour of an image of the area before the fire breaks out, the contour of the area on fire is compared with the basic contour, a matching area is determined to be an ignition area, and remaining areas are determined to be flames.

Meanwhile, (B) may be performed such that, when an area having a temperature equal to or greater than a reference temperature is present in the captured image received from the infrared camera, the area is determined to be an area on fire, a contour of the area on fire is generated by extracting a contour of an image of the area on fire, and an area of the contour is determined to be a flame when the contour continuously varies for a preset period of time or longer.

Preferably, (B) or (C) is performed such that, when the image captured by the infrared camera or the CCD camera is output to the control center terminal, the control unit connects images, captured by the infrared camera or the CCD camera while the infrared camera or the CCD camera is rotating at angles of 360°, as a single panoramic image file, and enables the panoramic image file to be continuously displayed on the control center terminal.

Further, (D) is performed such that the information about breakout of the fire, the location of breakout of the fire, the size of the flame and the spreading speed of the flame is provided to a pre-designated disaster prevention center when the fire has broken out.

Meanwhile, the method further comprises, when the system for detecting a fire uses a plurality of fire detection devices, the control center terminal determining an average point of locations of breakout of the fire received from one or more fire detection devices to be an actual location of breakout of the fire.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Hereinafter, embodiments of a system for detecting a fire according to the present invention will be described in detail with reference to the attached drawings.

Figure 1:
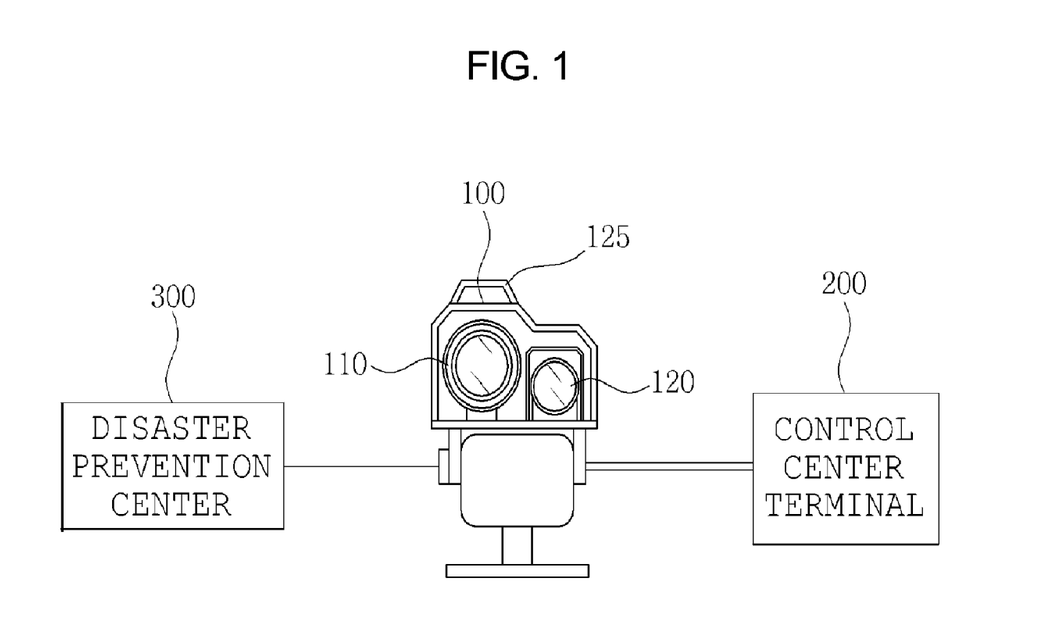
FIG. 1 is a diagram showing the overall construction of a system for detecting a fire according to an embodiment of the present invention.
Figure 2:
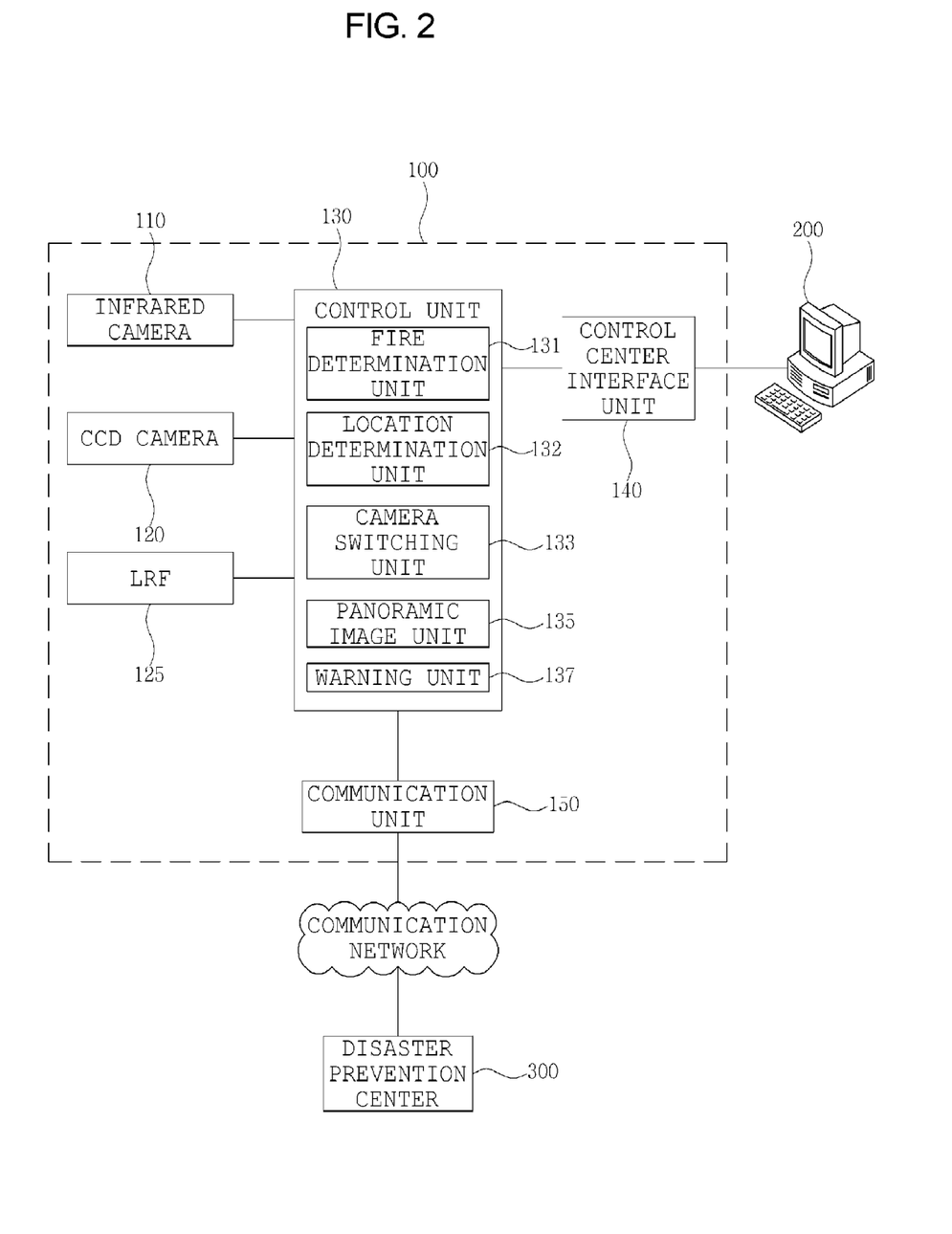
FIG. 2 is a block diagram showing the internal construction of a fire detection device according to an embodiment of the present invention.

FIG. 1 is a diagram showing the overall construction of a system for detecting a fire according to an embodiment of the present invention, and FIG. 2 is a block diagram showing the internal construction of a fire detection device according to an embodiment of the present invention.

As shown in the drawings, the system of the present invention includes a fire detection device 100, a control center terminal 200, and a disaster prevention center 300.

The fire detection device 100 includes an infrared camera 110, a Charged Coupled Device (CCD) camera 120, a Laser Ranger Finder (LRF) 125, a control unit 130, a communication unit 150, and a control center interface unit 140.

The infrared camera 110 captures an infrared image and transmits the infrared image to the control unit 130. Here, the term 'infrared image' means an image captured by the infrared camera 110.

The CCD camera 120 captures a CCD image and transmits the CCD image to the control unit 130. Here, the term 'CCD image' means an image captured by the CCD camera 120.

Each of the infrared camera 110 and the CCD camera 120 may further include a camera driving unit (not shown)

capable of controlling operations such as the focusing or tracking of the infrared camera or the CCD camera under the control of the control unit 130, which will be described later.

The LRF 125 is a distance measurement unit using a laser, and is a typically used tool, and thus a description of the detailed construction of the LRF is omitted.

The control unit 130 includes a fire determination unit 131, a location determination unit 132, a camera switching unit 133, a panoramic image unit 135 and a warning unit 137.

The fire determination unit 131 is configured such that, when an area having a temperature equal to or greater than a reference temperature (for example, 200° C.) is present in the captured image received from the infrared camera 110, the fire determination unit 131 determines that the area is an area on fire, generates the contour of the area on fire by extracting the contour of the image of the area on the fire, generates a basic contour by extracting the contour of the image of the relevant area before the fire breaks out, compares the contour of the area on fire with the basic contour, and determines a matching area to be an ignition area, and the remaining areas to be flames. This is possible because the infrared image captured by the infrared camera 100 is stored in a storage unit (not shown).

According to the above description, the degree of danger of the fire or the degree of spreading of the fire may be accurately known according to the intensity level of the fire, and thus there is an advantage in that the fire can be put out using a suitable method.

Further, the fire determination unit 131 is configured such that, when an area having a temperature equal to or greater than a reference temperature (for example: 200° C.) is present in the captured image received from the infrared camera 110, the fire determination unit 131 preferably determines the area to be an area on fire, generates the contour of the area on fire by extracting the contour of the image of the area on fire, and determines an area of the contour to be a flame when the contour continuously varies for a preset period of time or longer (for example: a swaying pattern of a reddish color).

In this case, the reason why it is determined that the fire has broken out when the contour of the flame continuously varies for a predetermined period of time or longer, is that the flame of a lighter or a gas range has an almost unchanged shape, and thus it is determined not to be a fire.

The location determination unit 132 determines a location at which the fire has broken out using the coordinates of the installation location of the infrared camera 110, the distance received from the LRF 125, and a capturing angle received from the infrared camera 110.

If it is determined by the fire determination unit 131 that the fire has broken out, the camera switching unit 133 switches the infrared camera 110, which has been operated to capture the area on fire, to the CCD camera 120. The reason for this is that the infrared camera 110 can automatically determine whether a fire has broken out thanks to its thermal sensing function, and that the CCD camera 120 can allow a manager to easily observe the area on fire after it is determined that the fire has broken out thanks to its excellent image quality.

The panoramic image unit 135 generates a panoramic image file by connecting images, captured by the infrared camera 110 or the CCD camera 120 while the infrared camera 110 or the CCD camera 120 is rotating at angles of 360°, as one panoramic image file.

According to the above description, the control center terminal 200 is advantageous in that the images captured by the infrared camera 110 or the CCD camera 120 are continuously displayed, thus allowing the user to conveniently view the images.

If it is determined that the fire has broken out, the warning unit 137 performs processing so as to obtain information about the location of breakout of the fire, the size of the flame, and the spreading speed of the flame and to output the obtained information to the control center terminal 200.

Further, the warning unit 137 performs processing such that, when a fire has broken out, the breakout of the fire is reported to a pre-designated disaster prevention center, and the information about the location of breakout of the fire, the size of the flame, and the spreading speed of the flame is provided.

Meanwhile, the control unit 130 receives a signal required to operate the focusing or tracking of the infrared camera 110 or the CCD camera 120 from the control center terminal 200, and then controls a camera driving unit (not shown). Further, the control unit 130 performs processing such that the images captured by the infrared camera 110 and the CCD camera 120 are output to the control center terminal 200 through the control center interface unit 140.

That is, the control unit 130 performs processing such that the entire operation of the fire detection device may be performed in such a way as to determine, using the images captured by the infrared camera 110 and the CCD camera 120, whether a fire has broken out and to notify both the disaster prevention center and the control center of the breakout of the fire if it is determined that the fire has broken out. This processing may be implemented by a microprocessor, a Digital Signal Processor (DSP), etc.

The control center terminal 200 receives the captured images from the fire detection device 100 and outputs the captured images to an output unit (not shown). Further, the control center terminal 200 may also control the camera driving unit of the infrared camera 110 or the CCD camera 120 so as to view images of a specific area through an input unit (not shown).

Next, the operating process of the system for detecting a fire according to the present invention will be described in detail with reference to the drawings.

Figure 3:
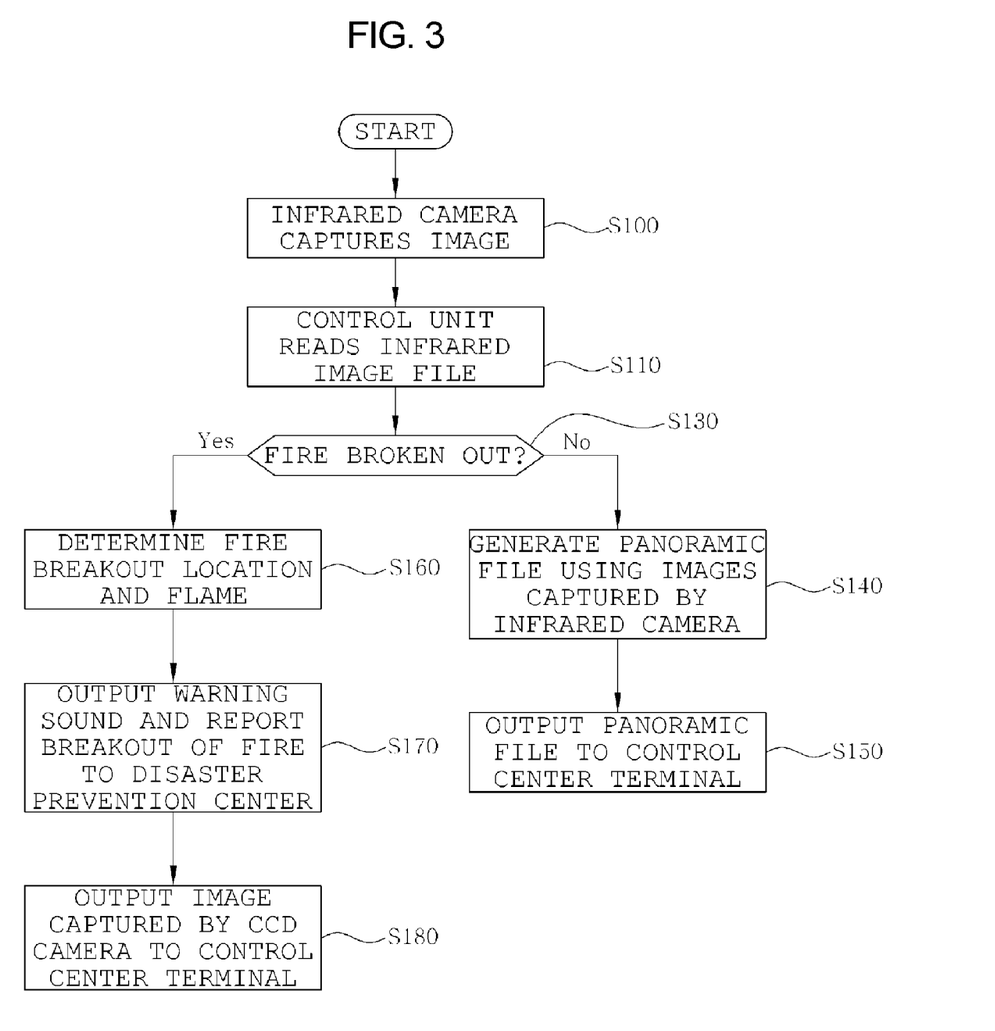
FIG. 3 is a flowchart showing the operating process of a system for detecting a fire according to an embodiment of the present invention.

FIG. 3 is a flowchart showing the operating process of the system for detecting a fire according to an embodiment of the present invention.

First, the infrared camera 110 captures an image of a desired area to be monitored for the detection of a fire, and transmits the captured infrared image to the control unit 130 at step S100.

The fire determination unit 131 analyzes the infrared image captured by the infrared camera 110, and then determines whether a fire has broken out at step S110.

Figure 4:
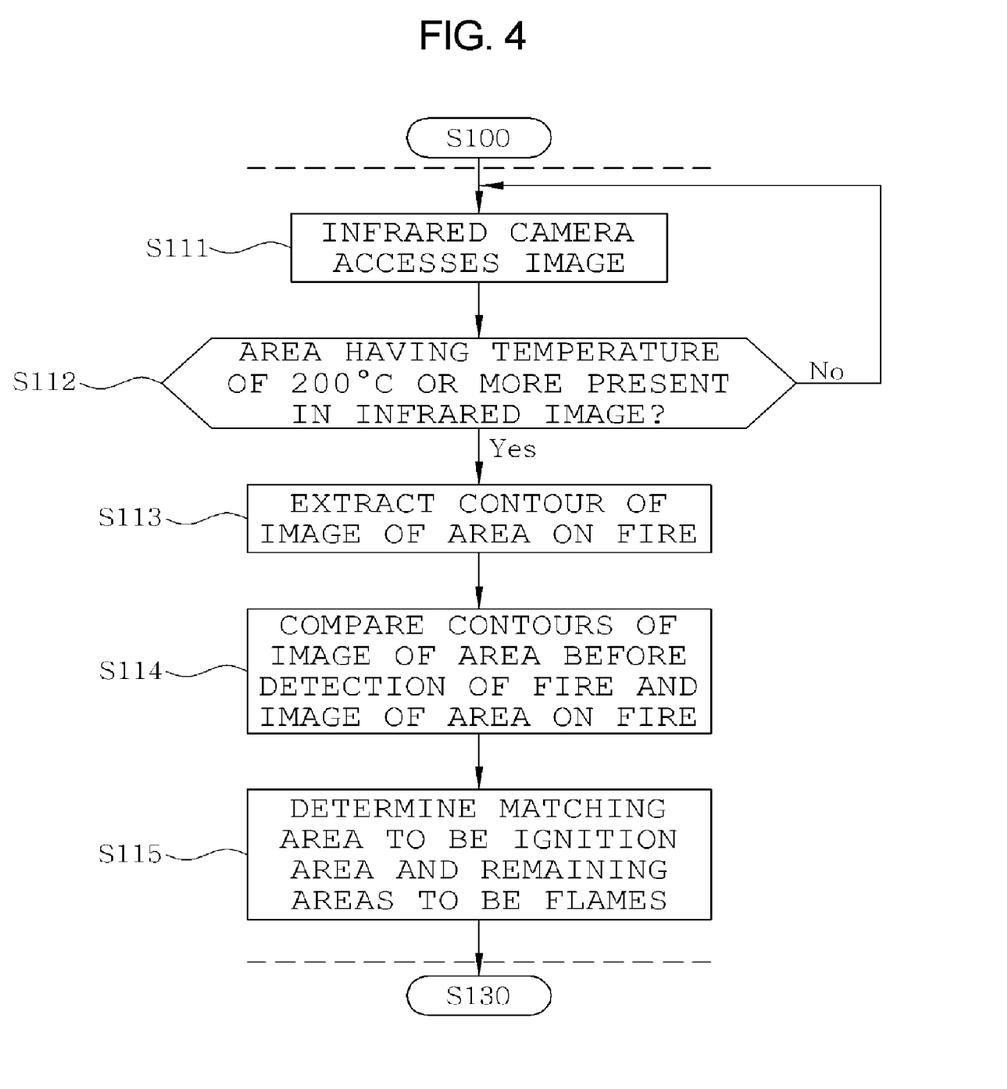
FIGS. 4 and 5 are detailed flowcharts showing step S110 of FIG. 3.
Figure 5:
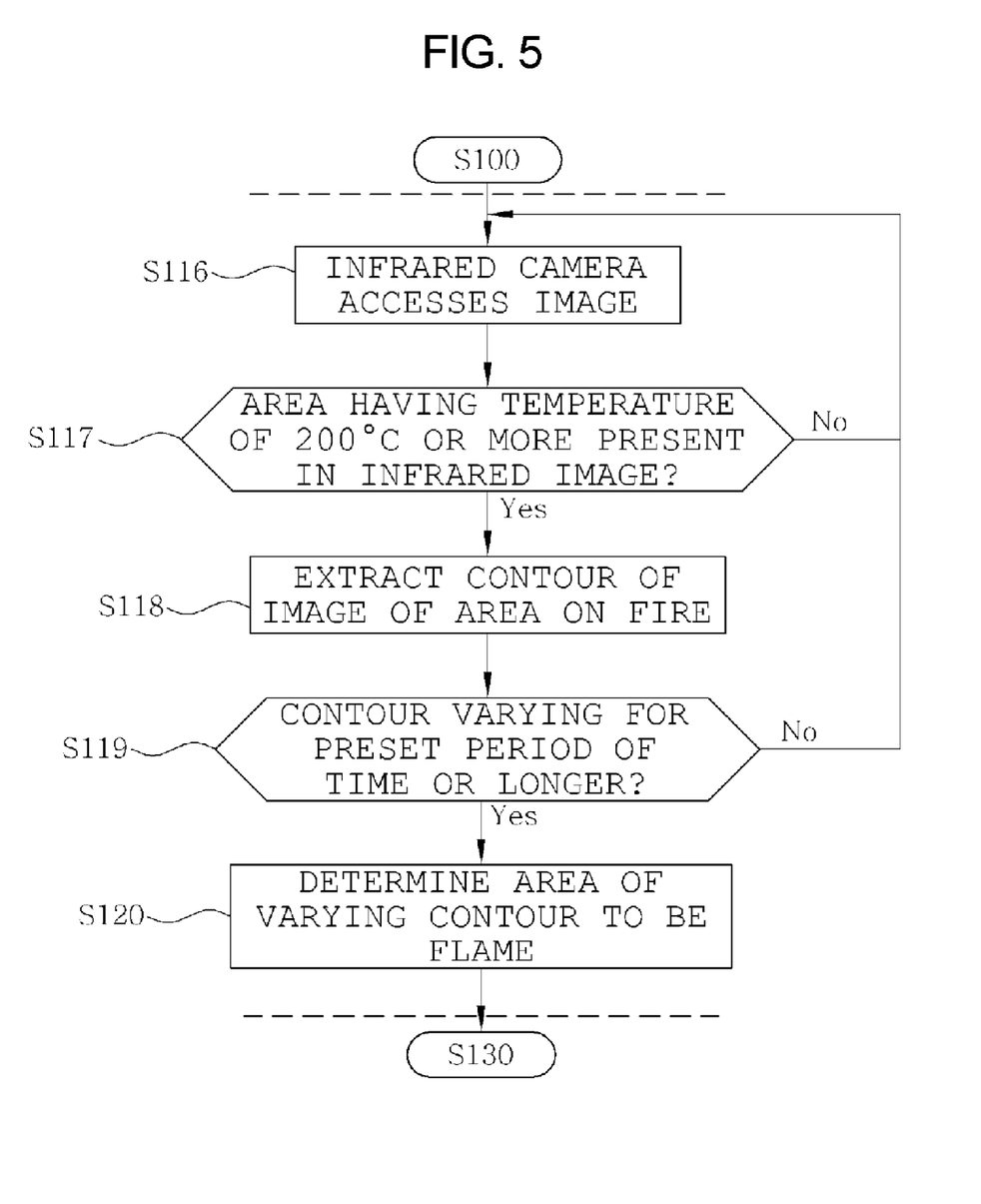

FIGS. 4 and 5 are flowcharts showing the detailed steps of step S110.

Referring to FIG. 4, in a first embodiment, the fire determination unit 131 accesses the captured image received from the infrared camera 110 at step S111. Thereafter, the fire determination unit 131 determines whether an area having a temperature equal to or greater than a reference temperature (for example, 200° C.) is present in the captured image at step S112.

If it is determined at step S112 that the area having a temperature equal to or greater than the reference temperature is present, the fire determination unit 131 determines the area to be an area on fire, and generates the contour of the area on fire by extracting the contour of the image of the area on fire at step S113. Further, the fire determination unit 131 generates a basic contour by extracting the contour of the image of the area before the fire breaks out, compares the contour of the area on fire with the basic contour at step S114, and determines a matching area to be an ignition area and the remaining areas to be flames at step S115.

Referring to FIG. 5, in a second embodiment, the fire determination unit 131 accesses the captured image received from the infrared camera 110 at step S116. Thereafter, the fire determination unit 131 determines whether an area having a temperature equal to or greater than a reference temperature (for example, 200° C.) is present in the captured image at step S117.

If it is determined at step S117 that the area having a temperature equal to or greater than the reference temperature is present, the fire determination unit 131 determines the area to be an area on fire, and generates the contour of the area on fire by extracting the contour of the image of the area on fire at step S118. When the contour continuously varies for a preset period of time or longer (for example, a swaying pattern of a reddish color) at step S119, the fire determination unit 131 determines the contour area to be a flame at step S120.

In this case, if it is determined by the fire determination unit 131 that a fire has broken out, the control unit 130 determines the location of breakout of the fire using the coordinates of the installation location of the infrared camera 110, the distance received from the LRF 125, and the capturing angle received from the infrared camera 110 at step S160. Here, the coordinates of the installation location of the infrared camera 110 are previously stored in the memory (not shown) of the fire detection device 110.

When one or more fire detection devices are used, the average point of the locations of breakout of the fire received from the one or more fire detection devices is determined to be an actual location of breakout of the fire, thus more accurately measuring the location of breakout of the fire.

Meanwhile, the location of breakout of the fire may be determined using methods other than the method of step S160.

Figure 6:
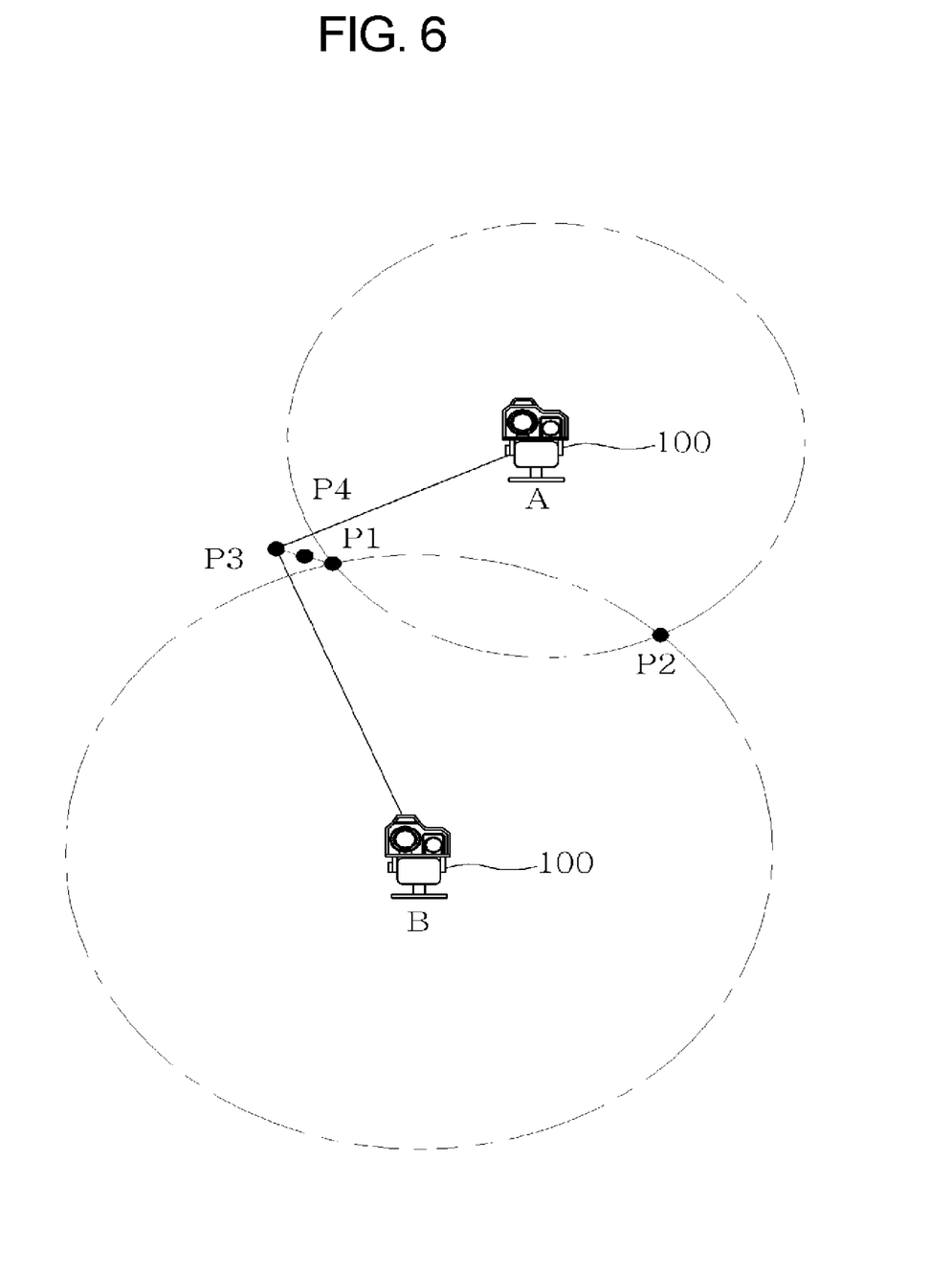
FIG. 6 is a diagram showing a system for detecting a fire according to another embodiment of the present invention.

FIG. 6 is a diagram showing the operating process of a system for detecting a fire according to another embodiment of the present invention.

Referring to FIG. 6, when one or more fire detection devices 10 (referring to FIGS. 6, A and B) are used, a control center terminal 200 generates two distance intersections (referring to FIG. 6, P1 and P2) using distances which are received from the two fire detection devices (A and B of FIG. 6) and are measured by LRFs, generates one angle intersection (P3 of FIG. 6) using the capturing angles of infrared cameras which are received from the two fire detection devices, detects a distance intersection closer to the angle intersection (referring to FIG. 6, a distance intersection closer to P3 is P1), and determines an average point (P4 of FIG. 6) of the detected distance intersection (P1 of FIG. 6) and the angle intersection (P3 of FIG. 6) to be the actual location of breakout of the fire.

After the location of breakout of the fire has been determined at step S160, processing is performed such that the determined fire breakout location is reported to a pre-designated disaster prevention center 300 and a warning sound or a warning message is output to the control center 200 or the fire detection device 100 at step S170.

In this case, it is preferable to provide information about the size of a flame and the spreading speed of the flame, together with the information about the location of breakout of the fire, to the disaster prevention center 300.

Further, the control unit 130 performs processing such that the area in which the fire has broken out is captured by the CCD camera 120, and transmits a CCD image captured by the CCD camera to the control center terminal 200 at step S180.

Meanwhile, if it is determined at step S130 by the fire determination unit 131 that a fire has not broken out, the panoramic image unit 135 generates a panoramic image file by connecting the images, captured by the infrared camera 110 while the infrared camera 110 is rotating at angles of 360°, as a single panoramic image file at step S140, and enables the panoramic image file to be continuously displayed on the control center terminal 200 at step S150.

According to the above-description, the present invention can provide a system and method for detecting a fire, which capture an image required to detect a fire using an infrared camera, and analyze the shape pattern and color of the image, so that whether a fire has broken out and a speed at which the fire is spreading can be determined, and where the fire has broken out can be accurately and promptly determined using a Laser Ranger Finder (LRF), thus allowing a suitable warning to be provided.

In addition, the present invention can provide a system and method for detecting a fire, which automatically determine, using the thermal sensing function of an infrared camera, whether a fire has broken out, and which allow a high-quality CCD camera to capture an image of an area on fire after it is determined that a fire has broken out, thus enabling the area on fire to be easily observed.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A system for detecting a fire, the system including a fire detection device and a control center terminal, wherein the fire detection device comprises:

a Laser Range Finder (LRF) for calculating a distance to a location of breakout of a fire using a laser when the fire has broken out;

an infrared camera for capturing an infrared image and transmitting the infrared image to a control unit;

a Charge Coupled Device (CCD) camera for capturing a CCD image and transmitting the CCD image to the control unit;

the control unit for analyzing the infrared image received from the infrared camera, determining whether a fire has broken out, performing processing such that the CCD camera captures an area on fire if it is determined that the fire has broken out, determining the location of breakout of the fire using coordinates of an installation location of the infrared camera, the distance received from the LRF, and a capturing angle received from the infrared camera, performing processing such that the image captured by the infrared camera or the CCD camera is output to the control center terminal, and controlling a function of a warning unit; and the warning unit for outputting a warning sound or a warning message under control of the control unit when the fire has broken out, and wherein the control unit performs processing such that, when an area having a temperature equal to or greater than a reference temperature is present in the captured image received from the infrared camera, the control unit determines the area to be an area on fire, generates a contour of the area on fire by extracting a contour of an image of the area on fire, determines an area of the contour to be a flame when the contour continuously varies for a preset period of time or longer, obtains information about a size of the flame and a spreading speed of the flame, enables the obtained information to be output to the control center terminal, and allows information about breakout of the fire, the location of breakout of the fire, the size of the flame, and the spreading speed of the flame to be provided to a pre-designated disaster prevention center when the fire has broken out.

2. The system according to claim 1, wherein the infrared camera or the CCD camera comprises a camera driving unit capable of controlling focusing or tracking operation of the infrared camera or the CCD camera under control of the control unit.

3. The system according to claim 1, wherein, when the control unit outputs the image captured by the infrared camera or the CCD camera to the control center terminal, the control unit connects images, captured by the infrared camera or the CCD camera while the infrared camera or the CCD camera is rotating at angles of 360°, as a single panoramic image file, and enabling the panoramic image file to be continuously displayed on the control center terminal.

4. The system according to claim 1, wherein when the system uses a plurality of fire detection devices, an average point of locations of breakout of the fire received from one or more fire detection devices is determined to be an actual location of breakout of the fire.

5. A system for detecting a fire, the system including one or more fire detection devices and a control center terminal, wherein each of the fire detection devices comprises:
   a Laser Range Finder (LRF) for calculating a distance to a location of breakout of a fire using a laser when the fire has broken out;
   an infrared camera for capturing an infrared image and transmitting the infrared image to a control unit;
   a Charge Coupled Device (CCD) camera for capturing a CCD image and transmitting the CCD image to the control unit;
   a control unit for performing processing such that, when an area having a temperature equal to or greater than a reference temperature is present in the captured image received from the infrared camera, the control unit determines the area to be an area on fire, generates a contour of the area on fire by extracting a contour of an image of the area on fire, determines an area of the contour to be a flame when the contour continuously varies for a preset period of time or longer, allows the CCD camera to capture the area on fire if it is determined that the fire has broken out, allows the image captured by the infrared camera or the CCD camera to be output to the control center terminal, controls a function of a warning unit, obtains information about a size of the flame and spreading speed of the flame, enables the obtained information to be output to the control center terminal, and allows information about breakout of the fire, the location of breakout of the fire, the size of the flame, and the spreading speed of the flame to be provided to a pre-designated disaster prevention center when the fire has broken out; and
   the warning unit for outputting a warning sound or a warning message under control of the control unit when the fire has broken out, and
   wherein the control center terminal generates two distance intersections using distances which are measured by respective LRFs and are received from two fire detection devices, generates one angle intersection using capturing angles of respective infrared cameras which are received from the fire detection devices, detects a distance intersection closer to the angle intersection, and determines an average point of the detected distance intersection and the angle intersection to be an actual location of breakout of the fire.

6. A method of detecting a fire using a system for detecting a fire, the system including a fire detection device and a control center terminal, wherein the fire detection device comprises:
   a Laser Range Finder (LRF) for calculating a distance to a location of breakout of a fire using a laser when the fire has broken out;
   an infrared camera for capturing an infrared image and transmitting the infrared image to a control unit;
   a Charge Coupled Device (CCD) camera for capturing a CCD image and transmitting the CCD image to the control unit;
   the control unit for analyzing the infrared image received from the infrared camera, determining whether a fire has broken out, performing processing such that the CCD camera captures an area on fire if it is determined that the fire has broken out, determining a location of breakout of the fire using coordinates of an installation location of the infrared camera, the distance received from the LRF, and a capturing angle received from the infrared camera, performing processing such that the image captured by the infrared camera or the CCD camera is output to the control center terminal, and controlling a function of a warning unit; and
   the warning unit for outputting a warning sound or a warning message under control of the control unit when the fire has broken out, and
   wherein the control unit performs processing such that, when an area having a temperature equal to or greater than a reference temperature is present in the captured image received from the infrared camera, the control unit determines the area to be an area on fire, generates a contour of the area on fire by extracting a contour of an image of the area on fire, determines an area of the contour to be a flame when the contour continuously varies for a preset period of time or longer, obtains information about a size of the flame and spreading speed of the flame, enables the obtained information to be output to the control center terminal, and allows information about breakout of the fire, the location of breakout of the fire, the size of the flame, and the spreading speed of the flame to be provided to a pre-designated disaster prevention center when the fire has broken out,
   the method comprising:
   (A) the infrared camera capturing an infrared image to detect a fire;
   (B) the control unit transmitting the infrared image captured by the infrared camera to the control center terminal, analyzing the infrared image, and determining whether a fire has broken out;
   (C) if it is determined at (B) by the control unit that the fire has broken out, the control unit performing processing such that the CCD camera captures an area in which the fire has broken out, transmitting the CCD image captured by the CCD camera to the control center terminal, and determining a location of breakout of the fire using coordinates of an installation location of the infrared camera, the distance received from the LRF, and the capturing angle received from the infrared camera; and
   (D) if it is determined at (B) by the control unit that the fire has broken out, the control unit performing processing such that a fire warning signal is output by controlling the warning unit.

7. The method according to claim 6, wherein (B) is performed such that, when an area having a temperature equal to or greater than a reference temperature is present in the captured image received from the infrared camera, the control unit determines the area to be an area on fire, generates a contour of the area on fire by extracting a contour of an image of the area on fire, and determines an area of the contour to be a flame when the contour continuously varies for a preset period of time or longer.

8. The method according to claim 6, wherein (B) or (C) is performed such that, when the image captured by the infrared camera or the CCD camera is output to the control center terminal, the control unit connects images, captured by the infrared camera or the CCD camera while the infrared camera or the CCD camera is rotating at angles of 360°, as a single panoramic image file, and enables the panoramic image file to be continuously displayed on the control center terminal.

9. The method according to claim 6, wherein (D) is performed such that the control unit provides the information about breakout of the fire, the location of breakout of the fire, the size of the flame and the spreading speed of the flame to a pre-designated disaster prevention center when the fire has broken out.

10. The method according to claim 6, wherein when the system for detecting a fire uses a plurality of fire detection devices, the control center terminal determining an average point of locations of breakout of the fire received from one or more fire detection devices to be an actual location of breakout of the fire.

\* \* \* \* \*